United States Patent
Mizutani et al.

(10) Patent No.: US 9,045,660 B2
(45) Date of Patent: Jun. 2, 2015

(54) INK SET AND INK JET RECORDING METHOD

(71) Applicant: Canon Kabushiki Kaisha, Tokyo (JP)

(72) Inventors: Takakazu Mizutani, Kawasaki (JP); Hideki Takayama, Fujisawa (JP); Kouhei Nakagawa, Kawasaki (JP); Yuhei Shimizu, Kawasaki (JP); Hiroshi Kakikawa, Fujisawa (JP)

(73) Assignee: Canon Kabushiki Kaisha, Tokyo (JP)

(*) Notice: Subject to any disclaimer, the term of this patent is extended or adjusted under 35 U.S.C. 154(b) by 64 days.

(21) Appl. No.: 14/023,271

(22) Filed: Sep. 10, 2013

(65) Prior Publication Data
US 2014/0078214 A1 Mar. 20, 2014

(30) Foreign Application Priority Data
Sep. 14, 2012 (JP) .................. 2012-203098

(51) Int. Cl.
C09D 11/02 (2014.01)
C09D 11/324 (2014.01)
C09D 11/40 (2014.01)

(52) U.S. Cl.
CPC .............. C09D 11/324 (2013.01); C09D 11/40 (2013.01)

(58) Field of Classification Search
USPC ....................................... 106/31.6
See application file for complete search history.

(56) References Cited

U.S. PATENT DOCUMENTS

| 2002/0107303 A1 | 8/2002 | Miyabashi |
| 2005/0007432 A1 | 1/2005 | Kanaya |
| 2005/0036021 A1 | 2/2005 | Ito |
| 2007/0040882 A1 | 2/2007 | Kanaya |
| 2009/0295847 A1 | 12/2009 | Mukai |
| 2010/0196602 A1* | 8/2010 | Koyano et al. ............. 427/256 |

FOREIGN PATENT DOCUMENTS

| EP | 1321495 A1 | 6/2003 |
| EP | 1754759 A2 | 2/2007 |
| JP | 2002-265831 A | 9/2002 |
| JP | 2007-051176 A | 3/2007 |
| JP | 2010-132908 A | 6/2010 |

* cited by examiner

Primary Examiner — Veronica F Faison
(74) Attorney, Agent, or Firm — Canon U.S.A. Inc. IP Division

(57) ABSTRACT

An ink set for ink jet includes a combination of a first ink and a second ink. The first ink contains a self-dispersible type carbon black and a specified particle A. The content of the particle A in the first ink is 0.05% by mass or more and 0.50% by mass or less, and the mass ratio of the content of the particle A to that of the self-dispersible pigment in the first ink is 0.056 times or more and 0.250 times or less. The second ink contains a specified particle B. The acid value a of the particle A and the acid value b of the particle B satisfy the relation of $a \leq b$.

11 Claims, 2 Drawing Sheets

INK SET AND INK JET RECORDING METHOD

BACKGROUND OF THE INVENTION

1. Field of the Invention

The present invention relates to an ink set and an ink jet recording method.

2. Description of the Related Art

Inks containing pigment as coloring material have been widely used in ink jet recording methods because of the excellent color saturation and fastness properties of the recorded images. Furthermore, the ink jet recording method must be able to record various images, including letters, tables and figures, photographs, and pictures, on a wide range of recording media such as plain paper and ones having a porous layer, e.g., glossy paper and art paper. The characteristics the inks should have are different depending on what kind of recording medium is used; thus, inks in which pigment is dispersed by different methods have been used for different purposes. For example, when glossy paper or a similar recording medium is used, inks containing a pigment dispersed with a resin dispersant are chosen because the use of such inks advantageously improves the glossiness, the abrasion resistance, and other characteristics of the recorded images. When the recording medium is plain paper, art paper, or the like, inks containing a "self-dispersible" pigment are chosen because this type of ink advantageously improves the optical density and the color saturation of the recorded images.

Researchers are seeking ways to make pigments such as carbon black and organic pigments self-dispersible, and the most widely used self-dispersible pigment is carbon black as a component of black inks. The self-dispersible type carbon black, which is better than the self-dispersible type organic pigment in regard to masking properties and color developability, is suitable for use as coloring material in inks for ink jet.

Some previous research has studied the addition of a resin particle to an ink containing a self-dispersible type carbon black. For example, Japanese Patent Laid-Open No. 2002-265831 proposes an ink containing a self-dispersible pigment and a resin particle whose average particle diameter is within ±50 nm of that of the pigment, and this improves the abrasion resistance of the images recorded using the ink and makes the ink less likely to clog the recording head used therewith. Japanese Patent Laid-Open No. 2010-132908 proposes an ink containing carbon black and a resin particle whose content is 20 times or more of that of carbon black, and the use of this ink reduces the metallic luster of images caused by reflected light. Furthermore, Japanese Patent Laid-Open No. 2007-051176 proposes an ink set including a black ink and a color ink. In this ink set, the black ink contains a self-dispersible pigment and a resin particle, and the color ink contains an organic pigment and a resin particle.

Extended-life of an ink jet recording apparatus with an increased yield has been in demand because of the recent trend toward resource saving. After extensive research on inks containing a self-dispersible type carbon black as coloring material, the inventors found that long-term ejection of such an ink causes the direction of ejection of the ink to deflect and the ink not to travel straight (irregular ejection due to continuous use). Adding a resin particle to the ink in attempt to solve this problem improved the irregular ejection due to continuous use but not to a sufficient extent. Furthermore, recording by an ink containing a self-dispersible type carbon black and a resin particle in combination with an ink containing a resin caused more significant irregular ejection (irregular ejection due to contact between inks). It is strongly recommended that any type of irregular ejection be immediately resolved because such a defect causes the ink(s) not to be applied to the intended points on the recording medium, affecting the quality of the resulting images. These problems, i.e., two types of irregular ejection, occurred regardless of the method used to eject the ink(s) or the configuration of the recording head.

SUMMARY OF THE INVENTION

In an aspect, the prevent invention provides an ink set with reduced irregular ejection. The ink set includes a combination of a first ink and a second ink. The first ink contains a self-dispersible type carbon black and a resin particle, and the second ink contains a resin. In another aspect, the invention provides an ink jet recording method using such an ink set.

An ink set according to an aspect of the invention is one for ink jet and includes a combination of a first ink and a second ink. The first ink contains a self-dispersible pigment and a particle A. The self-dispersible pigment is a carbon black having an anionic group bonded to the surface thereof directly or through another atomic group, and the particle A is at least one selected from the group consisting of a resin particle having an anionic group and a pigment dispersed by a water-soluble resin having an anionic group. The content of the particle A in the first ink is 0.05% by mass or more and 0.50% by mass or less, and the mass ratio of the content in % by mass of the particle A to the content in % by mass of the self-dispersible pigment in the first ink, is 0.056 times or more and 0.250 times or less. The second ink contains a particle B, and the particle B is at least one selected from the group consisting of a resin particle having an anionic group and a pigment dispersed by a water-soluble resin having an anionic group. The acid value a of the particle A and the acid value b of the particle B satisfy the relation of $a \leq b$.

The invention, in an aspect, provides an ink set with reduced irregular ejection including a combination of a first ink containing a self-dispersible carbon black and a resin particle and a second ink containing a resin and, in another aspect, provides an ink jet recording method using such an ink set.

Further features of the present invention will become apparent from the following description of exemplary embodiments with reference to the attached drawings.

DESCRIPTION OF THE EMBODIMENTS

The following describes some embodiments of the invention to make the invention more clearly understood. All of the physical properties given hereinafter, such as surface tension, viscosity, and pH, are values at 25° C. As used herein, the term water-soluble resin refers to a resin that does not form a particle having a measurable diameter when neutralized with an amount of an alkali equivalent to the acid value of the resin, whereas the term resin particle represents a resin that forms a particle having a measurable diameter under the same conditions.

An ink set according to an embodiment of the invention is one for ink jet including a combination of a first ink and a second ink. The first ink contains a self-dispersible pigment (a carbon black having an anionic group bonded to the surface thereof directly or through another atomic group) and a particle A (at least one selected from the group consisting of a resin particle having an anionic group and a pigment dispersed by a water-soluble resin having an anionic group). The content of the particle A in the first ink is 0.05% by mass or more and 0.50% by mass or less, and the mass ratio of the content of the particle A to that of the self-dispersible pigment in the first ink is 0.056 times or more and 0.250 times or less. The second ink contains a particle B (at least one selected from the group consisting of a resin particle having an anionic group and a pigment dispersed by a water-soluble resin having an anionic group). Another requirement is that the acid value a of the particle A in the first ink and the acid value b of the particle B in the second ink should satisfy the relation of a≤b. Hereinafter a self-dispersible type carbon black and an ink set for ink jet may be simply referred to as a self-dispersible pigment and an ink set, respectively.

Irregular Ejection Due to Continuous Use

Figure 1A:
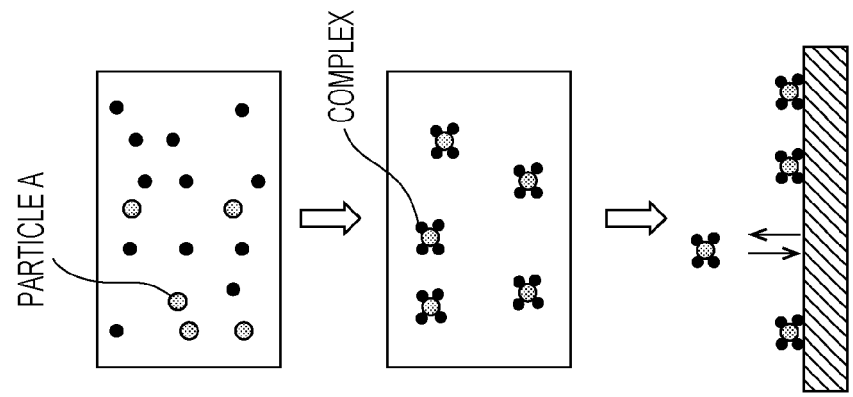
FIGS. 1A to 1C are schematic cross-sectional diagrams illustrating the ejection orifice surface of a recording head after continuous ejection.
Figure 1B:
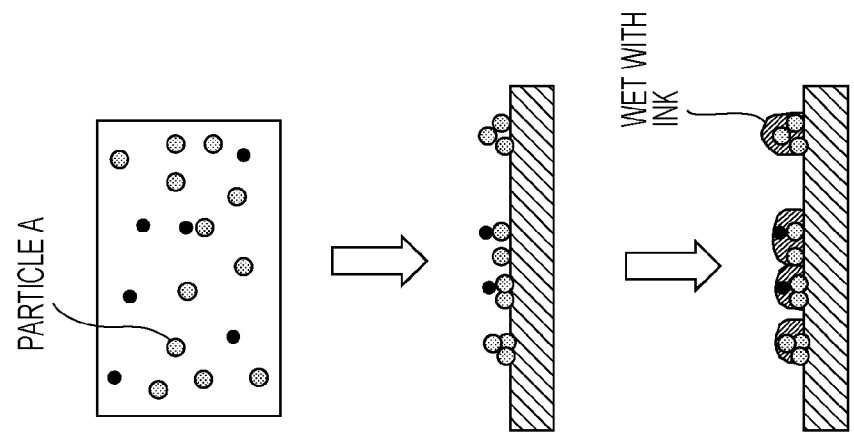
Figure 1C:
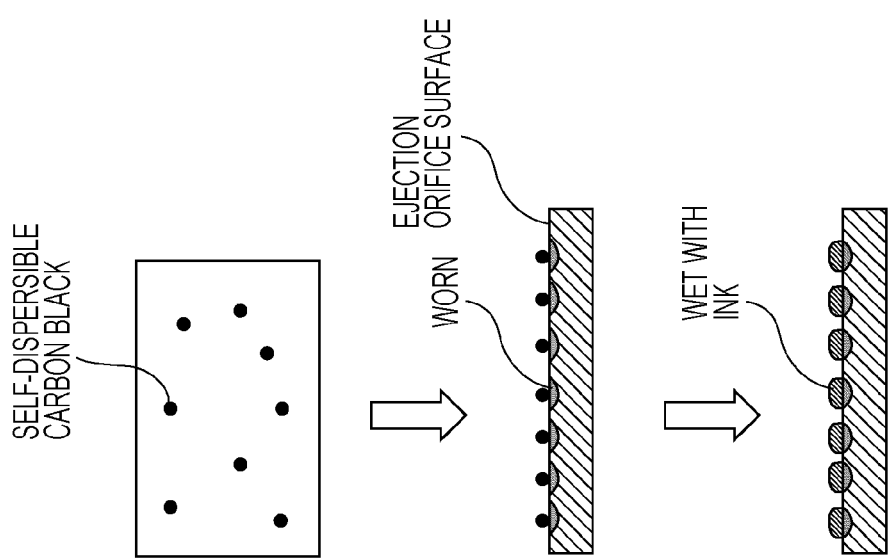

The inventors conducted research to find out a solution to the problem with the use of inks containing a self-dispersible type carbon black and a resin particle, i.e., irregular ejection due to continuous use. The research revealed that a first ink containing a self-dispersible pigment can be used with reduced irregular ejection even after long-term use if the first ink contains a particle A in such an amount that the mass ratio of the particle A to the self-dispersible pigment is in an appropriate range. The following describes a possible cause of this problem and a possible mechanism for the advantages of the configuration of this embodiment of the invention with reference to FIGS. 1A to 1C, schematic cross-sectional diagrams illustrating the ejection orifice surface of a recording head after continuous ejection. FIGS. 1A to 1C omit ejection orifices for the sake of simplicity.

First, the cause of the irregular ejection due to continuous use that occurs with an ink containing a self-dispersible type carbon black and no resin particle is described with reference to FIG. 1A. Ink jet recording methods involve removing ink adhering to the ejection orifice surface of the recording head with a wiper made of an elastic material such as rubber. During the recording process, the wiper is pressed against the ejection orifice surface at regular intervals and removes the ink adhering to the ejection orifice surface. This operation is called wiping. Since the carbon black particle in the ink is very hard, repeated wiping causes the carbon black to serve as an abrasive, making the ejection orifice surface worn and damaged. This results in uneven wetting of the affected and intact portions of the ejection orifice surface with the inks, leading to irregular ejection.

Adding a particle A to this ink also results in the particle A in the ink adhering to the ejection orifice surface. The particle A is a resin particle or a pigment dispersed by a resin, and the presence of resin makes this particle not so hard and unlikely to wear the ejection orifice surface during wiping, compared to the self-dispersible type carbon black in the above instance. However, as illustrated in FIG. 1B, this arrangement also results in the ejection orifice surface being unevenly wet with the ink and leads to irregular ejection because the anionic resin contained in the particle A brings the sites on the ejection orifice surface holding this particle into a state similar to the hydrophilic condition.

With the first ink in the ink set according to this embodiment of the invention, this type of irregular ejection does not occur even after the ink is used for a long period of time. More specifically, inks satisfying the following conditions can be used with reduced irregular ejection even after continuous use: the content of the particle A is 0.05% by mass or more and 0.50% by mass or less, and the mass ratio of the content of the particle A to that of the self-dispersible pigment is 0.056 times or more and 0.250 times or less. In such an ink, as illustrated in FIG. 1C, the self-dispersible pigment and the particle A attract each other through hydrophobic interactions, and a complex is formed in which the particle A is surrounded by the self-dispersible pigment because the pigment is more abundant than the particle A. Compared to the self-dispersible type carbon black in the above instance, this complex is not so hard because of the presence of resin in the particle A, and is unlikely to wear the ejection orifice surface during wiping since the particle A provides a buffer against physical impact.

Furthermore, the self-dispersible pigment existing around the particle A in the complex makes the complex adhere to the ejection orifice surface in a very small area and, therefore, with weak force. The adhering complex is therefore easy to remove by wiping and, as a result, the ejection orifice surface is prevented from being unevenly wet with the ink. Both of these two mechanisms are necessary for the reduction of the irregular ejection of the first ink due to continuous use.

If the aforementioned mass ratio is less than 0.056 times or the content of the particle A is less than 0.05% by mass, the self-dispersible pigment is so much compared to the particle A that some of the pigment does not participate in the formation of the complex and remains unused. In this case, the surplus self-dispersible pigment wears the ejection orifice surface, leading to a situation similar to that illustrated in FIG. 1A; the degree of irregular ejection is not reduced. If the mass ratio is more than 0.250 times or the content of the particle A is more than 0.50% by mass, the particle A is so much compared to the self-dispersible pigment that some of the particle A does not participate in the formation of the complex and remains unused. In this case the surplus particle A adheres to the ejection orifice surface, the ejection orifice surface becomes unevenly wet with the inks, and a situation similar to that illustrated in FIG. 1B arises; the degree of irregular ejection is not reduced either. Furthermore, the irregular ejection of the first ink due to continuous use makes the irregular ejection due to contact between inks, described later herein, more likely to occur.

In addition, making the aforementioned mass ratio 0.056 times or more and 0.080 times or less or making the content of the particle A 0.05% by mass or more and 0.40% by mass or less can reduce the irregular ejection due to continuous use to a greater extent.

Irregular Ejection Due to Contact Between Inks

Figure 2:
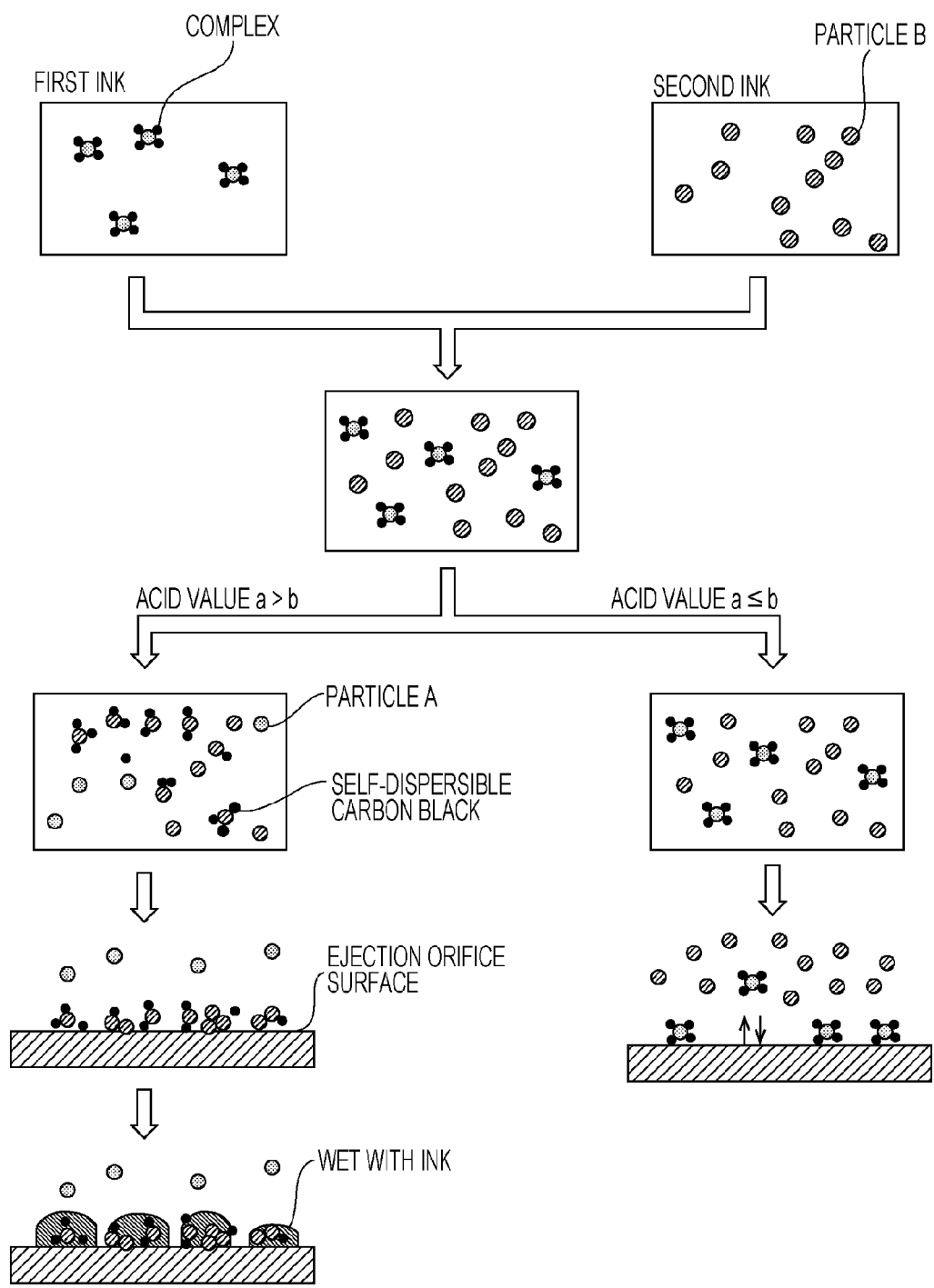
FIG. 2 is a schematic diagram illustrating a cross-section of the ejection orifice surface of a recording head after different inks come into contact with each other.

The inventors then tried to solve the problem encountered when recording by a first ink containing a self-dispersible pigment and a particle A in combination with an ink containing a particle B, i.e., irregular ejection due to contact between inks. Their research found that the first ink can be used with reduced irregular ejection even in combination with the second ink if the acid value a of the particle A in the first ink and the acid value b of the particle B in the second ink satisfy the relation of a≤b. The following describes a possible cause of this problem and a possible mechanism for the advantages of the configuration of this embodiment of the invention with reference to FIG. 2, a schematic diagram illustrating a cross-section of the ejection orifice surface of a recording head after the contact between the first ink and the second ink. FIG. 2 omits ejection orifices for the sake of simplicity.

The use of two or more inks in an ink jet recording method can lead to the inks coming into contact with each other in association with the formation of fine ink droplets (mist) during the ejection of the inks from the recording head or while suction recovery operation is in process to clear clogged ejection orifices or for other recovery purposes, for example. The contact between different inks can occur not only near the recording head but also on the ejection orifice surface or in nozzles.

When the first ink comes into contact with an ink containing at least one selected from the group consisting of a resin particle having an anionic group and a pigment dispersed by a water-soluble resin having an anionic group (a particle B), the outcome depends on the relation between the acid value of the particle A and that of the particle B. If the acid value of the particle A is higher than that of the particle B (a>b), the self-dispersible pigment, which forms a complex in the first ink through the hydrophobic interactions with the particle A, starts to be adsorbed onto the particle B because the particle B, which has a lower acid value and is more hydrophobic than the particle A, attracts the pigment through stronger hydrophobic interactions than the particle A does. As a result, the complex is broken, the particle A is released, and the self-dispersible pigment is adsorbed onto the particle B. In particular, when some amount of the second ink has got into the nozzles for the first ink, the second ink is more abundant than the first ink near the ejection orifices in the nozzles for the first ink. In this case the particle B, originating in the second ink, preferentially adheres to the ejection orifice surface, and the anionic resin contained in the particle B brings the affected sites on the ejection orifice surface into a state similar to the hydrophilic condition; the ejection orifice surface becomes wet with the inks, and irregular ejection occurs.

Using the particle A and the particle B in such a way to satisfy the relation between their acid values according to this embodiment of the invention will prevent irregular ejection due to contact between inks from occurring. More specifically, if the acid value of the particle A is equal to that of the particle B or the acid value of the particle A is lower than that of the particle B (a≤b), unlike in the above case where a>b, the complex in the first ink remains stable even after the contact with the particle B in the second ink. This is because the particle B has a higher acid value and is less hydrophobic than the particle A and thus cannot reverse the order of strength of hydrophobic interactions. The complex, originating in the first ink, preferentially adheres to the ejection orifice surface because the particle A has a lower acid value and is more hydrophobic than the particle B, and the adhering complex can be easily removed by wiping. As a result, the ejection orifice surface is prevented from being wet with the inks. Furthermore, the complex preferentially adhering to the ejection orifice surface inhibits the adhesion of the particle B. In this embodiment of the invention, such a mechanism works to reduce the degree of the irregular ejection that occurs when the first ink and the second ink come into contact with each other.

In addition, a combination of the acid value a of the particle A and the acid value b of the particle B that satisfies the relation of b−a≥20 can reduce the irregular ejection due to contact between inks to a greater extent.

Ink Set

The following describes an ink set according to this embodiment of the invention in detail, focusing on the components of the first and second inks and the physical properties of the inks.

Coloring Material in the First Ink

The coloring material in the first ink is a self-dispersible pigment, and this pigment is a carbon black having an anionic group bonded to the surface thereof directly or through another atomic group. Self-dispersible type carbon blacks can be dispersed in ink without resin dispersants or with a reduced amount of resin dispersant. The content (% by mass) of the self-dispersible pigment in the first ink is preferably 0.10% by mass or more and 10.00% by mass or less, more preferably 1.00% by mass or more and 5.00% by mass or less, based on the total mass of the first ink. The average particle diameter of the self-dispersible pigment is preferably 50 nm or more and 200 nm or less, more preferably 60 nm or more and 120 nm or less, as measured by the volume-based average particle diameter ($D_{50}$), i.e., the value at 50% in the cumulative particle diameter distribution.

The carbon black may be of any kind; all kinds of carbon blacks can be used, including furnace black, lamp black, acetylene black, channel black, and gas black. Examples of anionic groups that can be bonded to the surface of the carbon black particle directly or through another atomic group include —COOM, —$SO_3$M, —$PO_3$HM, and —$PO_3M_2$, where M denotes hydrogen, an alkali metal, ammonium, or an organic ammonium. Examples of atomic groups (—R—) through which the anionic group can be bonded to the surface of the carbon black include the following: linear or branched alkylene groups containing 1 to 12 carbon atoms; arylene groups such as phenylene and naphthylene; amide; sulfonyl; amino; carbonyl; ester; and ether. Combinations of such atomic groups can also be used. Examples of alkali metals denoted by M in the formulae listed above include lithium, sodium, and potassium. Examples of organic ammoniums denoted by M in the formulae listed above include ions of alkyl amines containing 1 to 3 carbon atoms, such as methylamine and ethylamine, and ions of alkanol amines containing 1 to 4 carbon atoms, such as monoethanolamine, diethanolamine, and triethanolamine. If the hydrophilic group(s) forms a salt, the salt in the ink may be in a partially or completely dissociated state.

Particles A and B

Each of the particles A and B, a component of the first and second inks, respectively, is at least one selected from the group consisting of a resin particle having an anionic group and a pigment dispersed by a water-soluble resin having an anionic group. Hereinafter a resin particle having an anionic group and a pigment dispersed by a water-soluble resin having an anionic group may be simply referred to as a resin particle and a resin-dispersed pigment, respectively.

The particles A and B may be of the same kind or different kinds. For example, it is possible that the first ink contains a resin particle as the particle A and the second ink contains a resin particle as the particle B. It is also possible that the first ink contains a resin particle as the particle A while the second ink contains a resin-dispersed pigment as the particle B, and vice versa. A resin particle and a resin-dispersed pigment can be used in combination. If either of the two types is chosen, two or more particles or pigments with different characteristics can be used. For example, it is possible to use a combination of two resin particles or two resin-dispersed pigments with different characteristics.

In the first ink, the content (% by mass) of the particle A should be 0.05% by mass or more and 0.50% by mass or less, and the mass ratio of the content (% by mass) of the particle A to the content (% by mass) of the self-dispersible pigment should be 0.056 times or more and 0.250 times or less. The content of the particle A and that of the self-dispersible pigment are both based on the total mass of the first ink. The content (% by mass) of the particle B in the second ink is preferably 0.10% by mass or more and 10.00% by mass or less, more preferably 0.50% by mass or more and 5.00% by mass or less, based on the total mass of the second ink. When two or more substances are used as the particle A or B, each satisfying the requirements specified herein, the total content of these substances is taken as the content of the particle.

The acid value a of the particle A and the acid value b of the particle B should satisfy the relation of a b. Preferably, the relation of b−a≥20 is satisfied. Each of the acid value a of the particle A and the acid value b of the particle B is preferably 40 mg KOH/g or more and 250 mg KOH/g or less. As used herein, the acid value of the particle A or B represents the acid value of the resin in the case of a resin particle and that of the water-soluble resin used as a dispersant for the pigment in the case of a resin-dispersed pigment.

The particle A may include a particle having a smaller average particle diameter than the particle B. When this is not satisfied, the particle B, which has a smaller average particle diameter and is more likely to diffuse than any particle in the particle A, is as likely to adhere to the ejection orifice surface as the complex in the first ink. This may bring the sites on the ejection orifice surface holding the particle B into a state similar to the hydrophilic condition, resulting in the ejection orifice surface being unevenly wet with the inks; the irregular ejection due to contact between inks may be reduced somewhat less than expected. It is also possible that the average particle diameter of the particle A and that of the particle B are each 30 nm or more and 200 nm or less as measured by the volume-based average particle diameter ($D_{50}$), i.e., the value at 50% in the cumulative particle diameter distribution. For the particle A, an average particle diameter less than 30 nm may cause the ejection orifice surface to be worn and unevenly wet with the inks because the particle A is so small that the complex is formed at a rate somewhat slower than expected. This may lead to both types of irregular ejection, i.e., one due to continuous use and one due to contact between inks, being reduced less than expected.

The following provides some specific examples of resin particles having an anionic group and pigments dispersed by a water-soluble resin having an anionic group that can be used as the particle A or B and describes some possible forms of the particles A and B.

Resin Particle Having an Anionic Group

The resin particle having an anionic group is a substance that forms an emulsion in the ink. An example of a resin particle that can be used contains at least a monomer having an anionic group and is obtained by copolymerizing this monomer as a building block of a hydrophilic unit with another that forms a hydrophobic unit. Specific examples of such monomers are given later herein.

When the particle A in the first ink is a resin particle, the content (% by mass) of the resin particle in the first ink is preferably 0.05% by mass or more and 0.50% by mass or less, more preferably 0.05% by mass or more and 0.40% by mass or less, based on the total mass of the first ink. When the particle B in the second ink is a resin particle, the content (% by mass) of the resin particle in the second ink is preferably 0.10% by mass or more and 5.00% by mass or less, more preferably 0.50% by mass or more and 2.00% by mass or less, based on the total mass of the second ink.

An example of a possible form of the resin particle is a particle having a core-shell structure, e.g., one obtained by soap-free polymerization. It is also possible to use a resin particle having a core-shell structure obtained by soap-free polymerization. The reason for this is as follows. An aqueous dispersion containing a resin particle obtained by emulsion polymerization often contains some amount of the emulsifier used in the polymerization process. The emulsifier residue mixed in the ink adheres to the ejection orifice surface and affects the complex. The affected complex may cause the ejection orifice surface to be worn and unevenly wet with the inks, leading to both types of irregular ejection, i.e., one due to continuous use and one due to contact between inks, being reduced less than expected.

In this embodiment of the invention, the particle A may include at least a resin particle. A resin particle contains more resin and forms a softer complex than a resin-dispersed pigment of the same volume. Such a complex protects the ejection orifice surface from wear more effectively and, therefore, reduces the irregular ejection due to continuous use and that due to contact between inks to a greater extent than a harder one. It is also possible that the particle A is a resin particle having a core-shell structure. The area of adhesion between the particle A in the complex and the ejection orifice surface decreases as the shape of the resin particle, i.e., the central part of the complex, becomes closer to a perfect sphere. Reducing the area of adhesion makes the complex less likely to adhere to and wear the ejection orifice surface and also easier to remove even if it adheres. Thus, a resin particle having a core-shell structure is more effective than one with a different structure in protecting the ejection orifice surface from uneven wetting with the inks and thereby preventing the irregular ejection due to continuous use and that due to contact between inks.

The mass ratio of the core polymer to the shell polymer (the core-shell ratio) in the resin particle having a core-shell structure can be 0.33 times or more and 1.5 times or less (core/shell). A core-shell ratio less than 0.33 times often causes the core polymer not to be spherical because the proportion of the core polymer is small. Such a low core-shell ratio therefore often leads to a large area of adhesion between the particle A in the complex and the ejection orifice surface and may cause the ejection orifice surface to be unevenly wet with the inks, leading to both types of irregular ejection, i.e., one due to continuous use and one due to contact between inks, being reduced somewhat less than expected. A core-shell ratio more than 1.5 times often causes a high stiffness of the resin particle because the proportion of the shell polymer is small. Such a high core-shell ratio therefore often leads to a high stiffness of the complex and may cause the ejection orifice surface to be worn and unevenly wet with the inks, also leading to both types of irregular ejection, i.e., one due to continuous use and one due to contact between inks, being reduced less than expected.

The acid value of the resin particle having a core-shell structure can be 200 mg KOH/g or less, and that of the shell polymer can be 400 mg KOH/g or less. An acid value of the resin particle having a core-shell structure more than 200 mg KOH/g or an acid value of the shell polymer more than 400 mg KOH/g causes the hydrophilicity of the resin particle to be too high. Too high a hydrophilicity of the resin particle may cause the complex to be formed somewhat less efficiently than expected and, as a result, the ejection orifice surface to be unevenly wet with the inks, leading to both types of irregular ejection, i.e., one due to continuous use and one due to contact between inks, being reduced less than expected. The acid value of the resin particle having a core-shell structure can be 40 mg KOH/g or more, and that of the shell polymer can be 60 mg KOH/g or more. Note that if a shell polymer having a high acid value is used, synthesizing the core polymer using no or small proportions of units derived from acid monomers can reduce the overall acid value of the resin particle having a core-shell structure to some extent.

Pigment Dispersed by a Water-soluble Resin having an Anionic Group

Examples of pigments dispersed by a water-soluble resin having an anionic group that can be used include pigments dispersed by a water-soluble resin physically adsorbed onto the surface of the pigment particle (a resin dispersant) and microcapsule pigments composed of a water-soluble resin and the pigment particle encapsulated in the resin. An example of a water-soluble resin that can be used as the resin dispersant contains at least a monomer having an anionic group and is obtained by copolymerizing this monomer as a building block of a hydrophilic unit with another that forms a hydrophobic unit. Specific examples of such monomers are given later herein. The pigment may be of any kind; all kinds of pigments for inks for ink jet can be used, including inorganic ones such as titanium oxide and carbon black and organic ones such as azo, phthalocyanine, quinacridone, isoindolinone, imidazolone, pyranthrone, (thio)indigo, diketopyrrolopyrrole, and dioxazine.

When the particle A in the first ink is a resin-dispersed pigment, the content (% by mass) of the resin-dispersed pigment in the first ink is preferably 0.10% by mass or more and 0.50% by mass or less, more preferably 0.10% by mass or more and 0.40% by mass or less, based on the total mass of the first ink. When the particle B in the second ink is a resin-dispersed pigment, the content (% by mass) of the resin-dispersed pigment in the second ink is preferably 0.10% by mass or more and 5.00% by mass or less, more preferably 0.50% by mass or more and 2.00% by mass or less, based on the total mass of the second ink. When the particle A or B is a resin-dispersed pigment, the content of the particle is the total content of the pigment dispersed by a water-soluble resin and the water-soluble resin.

The average particle diameter of the resin-dispersed pigment is preferably 30 nm or more and 200 nm or less, more preferably 60 nm or more and 130 nm or less. The PB ratio of the resin-dispersed pigment (the mass ratio of the pigment to the water-soluble resin) is preferably 0.1 times or more and 10.0 times or less, more preferably 0.5 times or more and 8.0 times or less. The weight-average molecular weight of the water-soluble resin, i.e., the resin dispersant, can be 1000 or more and 30,000 or less, and the acid value of the resin dispersant is preferably 40 mg KOH/g or more and 200 mg KOH/g or less, more preferably 120 mg KOH/g or more and 200 mg KOH/g or less.

This embodiment of the invention requires that the content of the particle A in the first ink be very low. This means that a resin particle is more suitable than a resin-dispersed pigment for use as the particle A. However, this does not apply to the second ink. The content of the particle B in the second ink can have a broader range of values than that of the particle A in the first ink, and the use of a self-dispersible pigment as the coloring material in the second ink may cause irregular ejection due to continuous use for the same reason as that described for the first ink. Thus, the particle B in the second ink may include at least a resin-dispersed pigment. The use of a resin-dispersed pigment as the particle B has an additional advantage: such a pigment often provides the ink with a high level of compatibility with glossy paper, one of the characteristics demanded of inks containing resin. It is also possible that the second ink is a clear ink, containing no pigment or any other coloring material. In this case, the particle B may be a resin particle.

Monomers

The resin particle having an anionic group or the water-soluble resin having an anionic group (resin dispersant) can be a copolymer having at least a hydrophilic unit and a hydrophobic unit. The following lists some examples of monomers that can be used to form these units. As used herein, the term (meth)acrylic means acrylic and methacrylic.

Examples of monomers that form a hydrophilic unit by polymerization include acid monomers such as (meth)acrylic acid, itaconic acid, maleic acid, and fumaric acid and anionic monomers derived from such acid monomers, e.g., anhydrides and salts. Examples of cations used in salts of such acid monomers include lithium, sodium, potassium, ammonium, and organic ammonium ions. In this embodiment of the invention, the resin particle or the water-soluble resin can contain at least a hydrophilic unit derived from (meth)acrylic acid.

Example of monomers that form a hydrophobic unit by polymerization include aliphatic alcohol (meth)acrylic acid esters such as methyl (meth)acrylate, ethyl (meth)acrylate, butyl (meth)acrylate, hexyl (meth)acrylate, 2-ethylhexyl (meth)acrylate, nonyl (meth)acrylate, and lauryl (meth)acrylate and aromatic monomers such as styrene, $\alpha$-methylstyrene, p-t-butylstyrene, phenyl (meth)acrylate, and benzyl (meth)acrylate. (Meth)acrylonitrile, vinyl acetate, and similar monomers can also be used. In this embodiment of the invention, the resin particle or the water-soluble rein can contain at least a hydrophobic unit derived from an aliphatic alcohol (meth)acrylic acid ester or an aromatic monomer.

Aqueous Medium

Each of the first and second inks can contain an aqueous medium. The aqueous medium can be water or a mixture of water and one or two or more water-soluble organic solvents. Various kinds of water such as deionized water and ion-exchanged water can be used. In this embodiment of the invention, each of the first and second inks can be an aqueous ink containing water as the aqueous medium. The content (% by mass) of water in each ink can be 50.00% by mass or more and 95.00% by mass or less based on the total mass of the ink. The content (% by mass) of the water-soluble organic solvent(s) in each ink can be 3.00% by mass or more and 50.00% by mass or less based on the total mass of the ink. All kinds of water-soluble organic solvents for inks of ink jet can be used, including alcohols, (poly)alkylene glycols, glycol ethers, and nitrogen-containing solvents.

Other Resins

Besides the resin particle as the particle A or B or the water-soluble resin used as dispersant, each of the first and second inks may contain other resins (water-soluble resins and/or resin particles) for improved performance such as higher quality of images. The content (% by mass) of such additional resins in each ink is preferably 0.05% by mass or more and 5.00% by mass or less, more preferably 0.10% by mass or more and 2.00% by mass or less, based on the total mass of the ink. Water-soluble resins used for such purposes, which are not intended to serve as resin dispersants, are not included in the content of the particle A or B. Furthermore, the use of additional resin particles does not affect the advantages of this embodiment of the invention unless the particle A or B fails to satisfy the requirements specified herein. The total content (% by mass) of all particles in each ink, excluding the self-dispersible pigment, is preferably 0.05% by mass or more and 15.0% by mass or less, more preferably 0.10% by mass or more and 10.0% by mass or less, based on the total mass of the ink.

However, too high a content of particles that do not satisfy the requirements specified herein, particularly in the first ink, may make the ink set less effective in reducing irregular ejection even if the ink contains a particle A that satisfies the requirements. Likewise, too high a content of particles having acid values that do not satisfy the relation specified herein may cause the ink set less effective in reducing irregular ejection even if the inks contain particles A and B that satisfy the specified relation of acid value. If particles that do not satisfy the requirements specified herein (excluding the self-dispersible pigment) are used in addition to particles A and B that satisfy the requirements, therefore, a possible solution is to avoid using too much of those particles. More specifically, it is preferred that the percentage of particles A or B that satisfy the requirements specified herein in all particles in each ink is 90.0% or more, more preferably 95.0% or more, even more preferably 100.0% (all of the particles in the ink are particles A or B that satisfy the specified requirements).

Other Components

Each of the first and second inks may contain water-soluble organic compounds that are solid at room temperature, such as urea and its derivatives, trimethylolpropane, and trimethylolethane, in addition to the aforementioned components. The content (% by mass) of such water-soluble organic compounds in each ink can be 0.10% by mass or more and 10.00% by mass or less based on the total mass of the ink. In particular, trimethylolpropane is highly compatible with the self-dispersible pigment and offers excellent moisture retention. If trimethylolpropane is added to the first ink, the content (% by mass) of trimethylolpropane can be 0.10% by mass or more and 5.00% by mass or less based on the total mass of the first ink. Each ink may further contain additives necessary for its intended physical properties, including antifoams, surfactants, pH-adjusting agents, preservatives, antimolds, antioxidants, and reduction inhibitors.

In particular, nonionic surfactants can be used to adjust the surface tension of the ink. Specific examples of nonionic surfactants that can be used include ethylene oxide adducts of acetylene glycol, polyoxyethylene alkyl ethers, polyoxyethylene-polyoxypropylene copolymers, silicone-based surfactants, and fluorinated surfactants. The content (% by mass) of nonionic surfactants in each ink is preferably 0.10% by mass or more and 2.00% by mass or less, more preferably 0.50% by mass or more and 1.50% by mass or less. The surface tension values of the first and second inks can satisfy a relation such as the one specified below when the content of nonionic surfactants in the first ink is less than that in the second ink.

Physical Properties of the Inks

Each of the first and second inks can have whatever physical properties that fall within the standard ranges or equivalents for ordinary inks for ink jet. For example, the viscosity of each ink is preferably 1.0 mPa·s or more and 3.0 mPa·s or less, more preferably 1.5 mPa·s or more and 3.0 mPa·s or less. The pH of each ink can be 7.5 or more and 9.5 or less. The surface tension of each ink can be 30.0 mN/m or more and 45.0 mN/m or less. As used herein, the term surface tension represents the static surface tension, which can be measured by the Wilhelmy method using a plate such as a platinum plate.

A possible arrangement in this embodiment of the invention is that the surface tension of the first ink is higher than that of the second ink. The reason for this arrangement is as follows. In a situation where the second ink has got into the nozzles for the first ink, the second ink is more abundant than the first ink near the ejection orifices in the nozzles for the first ink and the particle B is also abundant in these portions of the nozzles.

If in this situation the surface tension of the first ink is equal to or lower than that of the second ink, the first ink flows into the second ink and, as a result, the complex in the first ink enters the regions rich in the particle B. A kind of shock occurs and breaks the complex, and the released particle A, which has an acid value smaller than that of the particle B, adheres to the ejection orifice surface and brings the affected sites on the ejection orifice surface into a state similar to the hydrophilic condition, resulting in the ejection orifice surface being unevenly wet with the inks; the irregular ejection due to contact between inks may be reduced somewhat less than expected. However, if in the same situation the surface tension of the first ink is higher than that of the second ink, the second ink flows into the first ink and, as a result, the particle B in the second ink enters the regions where the complex formed by the self-dispersible pigment and the particle A exists. In this case, the complex remains stable; the ejection orifice surface is not wet with the inks, and the irregular ejection due to contact between inks is reduced to a great extent.

Ink Jet Recording Method

An ink jet recording method according to another embodiment of the invention includes ejecting the first and second inks of an ink set according to an embodiment of the invention, described above, from a recording head for ink jet methods to a recording medium to record an image on the recording medium. The inks can be ejected by, for example, applying mechanical energy or thermal energy to the inks. A possible way to eject the inks in this embodiment of the invention is to load the inks into a recording head having its ejection orifice surface treated with a fluoropolymer or a modified silicone for water repellency and then apply thermal energy to the inks. The process of ink jet recording can be a known one except that inks according to an embodiment of the invention are used.

EXAMPLES

The following illustrates some examples and comparative examples of the present invention to describe some aspects of the invention in more detail. These examples should not be construed as limiting the scope of the invention. The units of measurement "parts" and "%" are all on a mass basis unless otherwise specified.

Average Particle Diameter Measurement

The average particle diameter of the pigments and resin particles used was measured using a light-scattering particle size distribution analyzer (Nanotrac UPA-EX150, Nikkiso Co., Ltd.) in the following way. For resin-dispersed pigments and self-dispersible pigments, a dispersion containing the pigment was diluted with purified water until the loading index was 1 to 2, and the diluted dispersion was analyzed using the analyzer under the following conditions: Set Zero, 30 s; the number of runs, 3; measurement time, 180 seconds; refractive index, 1.5. For resin particles, the prepared resin particle was diluted with purified water by a factor of 50 by volume, and the diluted particle was analyzed using the analyzer under the following conditions: Set Zero, 30 s; the number of runs, 3; measurement time, 180 seconds; refractive index, 1.5. The inventors have confirmed that the average particle diameter of a dispersion containing a resin-dispersed pigment or a self-dispersible pigment or an aqueous dispersion containing a resin particle measured in this way is equivalent to that of the resin-dispersed pigment, self-dispersible pigment, or resin particle in ink. Of course, other analyzers and conditions can also be suitable.

Synthesis of Resins

Resin particles P1 to P19 and P21 to P26 and a water-soluble resin P20 were synthesized by the following procedure. The abbreviations are defined as follows: HA, hexyl acrylate; NA, nonyl acrylate; 2EHA, 2-ethylhexyl acrylate; LA, n-lauryl acrylate; MMA, methyl methacrylate; EMA, ethyl methacrylate; nBMA, n-butyl methacrylate; tBMA, t-butyl methacrylate; AA, acrylic acid; MAA, methacrylic acid; tBA, t-butyl acrylate; nBA, n-butyl acrylate; St, styrene; AAm, acrylamide; TEGdAc, triethylene glycol diacrylate; EGdMAc, ethylene glycol dimethacrylate. The core-shell ratio is the mass ratio of the core polymer to the shell polymer (core/shell).

Resin Particles P1 to P14, P16, P17, P19, and P26

Resin particles having core-shell structures P1 to P14, P16, P17, P19, and P26 were synthesized by soap-free polymerization by the following procedure. Shell polymers S1 to S18 were first synthesized. One hundred (100.0) parts of ethylene glycol monobutyl ether was put into a four-necked flask equipped with a stirrer, a reflux condenser, and a nitrogen inlet tube, and the reaction system was heated to 110° C. while stirring and introducing a nitrogen gas. A mixture of monomers, specified along with quantities in Table 1, and a solution of 1.3 parts of t-butyl peroxide (polymerization initiator) in ethylene glycol monobutyl ether were added dropwise to the flask over 3 hours. After 2 hours of aging, ethylene glycol monobutyl ether was removed under reduced pressure. The obtained solid resin was neutralized at 80° C. with an amount of potassium hydroxide equivalent to the acid value of the resin and an appropriate quantity of ion-exchanged water. In this way, an aqueous solution containing 30.0% shell polymer (solid content) was obtained. Table 1 summarizes the acid value and the weight-average molecular weight of shell polymers S1 to S18.

TABLE 1

Major Characteristics of Shell Polymers

| Shell polymer | Composition (parts) | | | | | | | | | | Acid value (mg KOH/g) | Weight-average molecular weight |
| --- | --- | --- | --- | --- | --- | --- | --- | --- | --- | --- | --- | --- |
| | HC | NA | 2EHA | LA | MMA | EMA | nBMA | tBMA | AA | MAA | | |
| S1  |      |      | 38.0 |      | 34.0 |      |      |      | 28.0 |      | 218 | 15,000 |
| S2  |      |      |      | 12.0 | 35.0 |      | 25.0 |      | 28.0 |      | 218 | 14,000 |
| S3  |      | 33.0 |      |      | 35.0 |      |      |      |      | 32.0 | 209 | 13,000 |
| S4  | 50.0 |      |      |      |      |      |      | 18.0 |      | 32.0 | 209 | 14,000 |
| S5  |      |      | 38.0 |      | 30.0 |      |      |      | 32.0 |      | 249 | 15,000 |
| S6  |      |      | 35.0 |      | 30.0 |      |      |      | 35.0 |      | 273 | 15,000 |
| S7  |      |      | 25.0 |      | 30.0 |      |      |      | 45.0 |      | 351 | 15,000 |
| S8  |      |      | 33.0 |      | 54.0 |      |      |      | 13.0 |      | 101 | 14,000 |
| S9  |      |      | 38.0 |      | 34.0 |      |      |      | 28.0 |      | 218 | 5,900 |
| S10 |      |      | 38.0 |      | 34.0 |      |      |      | 28.0 |      | 218 | 4,300 |
| S11 |      |      | 38.0 |      | 34.0 |      |      |      | 28.0 |      | 218 | 15,000 |
| S12 |      |      | 38.0 |      | 34.0 |      |      |      | 28.0 |      | 218 | 15,000 |
| S13 |      |      | 38.0 |      | 34.0 |      |      |      | 28.0 |      | 218 | 15,000 |
| S14 |      |      | 38.0 |      | 34.0 |      |      |      | 28.0 |      | 218 | 15,000 |
| S15 |      |      | 22.0 |      | 38.0 |      |      |      | 40.0 |      | 312 | 14,000 |
| S16 |      |      | 20.0 |      | 26.0 |      |      |      | 54.0 |      | 421 | 16,000 |
| S17 |      |      | 24.0 |      | 38.0 |      |      |      | 38.0 |      | 296 | 15,000 |
| S18 |      |      | 22.0 |      | 33.0 |      |      |      | 45.0 |      | 351 | 14,000 |

Each of the aqueous solutions containing the shell polymer was put into a four-necked flask equipped with a stirrer, a reflux condenser, and a nitrogen inlet tube in accordance with the charge-in quantity of the shell polymer (solid content) specified in Table 2. The reaction system was then heated to 80° C. while stirring and introducing a nitrogen gas. A mixture of the monomers specified in Table 2, the constituents of the core polymer, was added to the flask in accordance with the charge-in quantity of the core polymer (solid content) specified in Table 2, and a solution of 1.0 part of potassium persulfate (polymerization initiator) in 16.7 parts of water was added dropwise over 3 hours. After 2 hours of aging, the solid content was adjusted with an appropriate quantity of ion-exchanged water. In this way, aqueous dispersions of resin particles having core-shell structures P1 to P14, P16, P17, P19, and P26 containing 15.0% resin (solid content) were obtained. The obtained resin particles P1 to P14, P16, P17, P19, and P26 were composed of a core polymer and a shell polymer coating the core polymer.

TABLE 2

Major Characteristics of Core Polymers

| Resin particle | Shell polymer No. | Charge-in quantity (parts) | Core polymer Composition (%) | | | | | | | | | Charge-in quantity (parts) |
| --- | --- | --- | --- | --- | --- | --- | --- | --- | --- | --- | --- | --- |
| | | | tBA | HA | NA | 2EHA | LA | MMA | EMA | nBMA | tBMA | |
| P1 | S1 | 60.0 |      |      |      | 20.0 |      | 80.0 |      |      |      | 40.0 |
| P2 | S2 | 64.0 |      | 20.0 |      |      | 40.0 |      | 20.0 | 20.0 |      | 36.0 |

TABLE 2-continued

Major Characteristics of Core Polymers

| Resin particle | Shell polymer No. | Charge-in quantity (parts) | tBA | HA | NA | 2EHA | LA | MMA | EMA | nBMA | tBMA | Charge-in quantity (parts) |
|---|---|---|---|---|---|---|---|---|---|---|---|---|
| | | | | | | Core polymer Composition (%) | | | | | | |
| P3 | S3 | 60.0 | | | 50.0 | | | 50.0 | | | | 40.0 |
| P4 | S4 | 70.0 | 15.0 | | | | 25.0 | | | | 60.0 | 30.0 |
| P5 | S5 | 60.0 | | | | 20.0 | | 80.0 | | | | 40.0 |
| P6 | S6 | 60.0 | | | | 20.0 | | 80.0 | | | | 40.0 |
| P7 | S7 | 42.0 | | | | 20.0 | | 25.0 | | 55.0 | | 58.0 |
| P8 | S8 | 74.0 | | | | 20.0 | | 80.0 | | | | 26.0 |
| P9 | S9 | 60.0 | | | | 20.0 | | 80.0 | | | | 40.0 |
| P10 | S10 | 60.0 | | | | 20.0 | | 80.0 | | | | 40.0 |
| P11 | S11 | 80.0 | | | | 20.0 | | 80.0 | | | | 20.0 |
| P12 | S12 | 75.0 | | | | 20.0 | | 80.0 | | | | 25.0 |
| P13 | S13 | 40.0 | | | | 20.0 | | 80.0 | | | | 60.0 |
| P14 | S14 | 36.0 | | | | 20.0 | | 80.0 | | | | 64.0 |
| P16 | S15 | 70.0 | | | | 20.0 | | 20.0 | | 60.0 | | 30.0 |
| P17 | S16 | 48.0 | | | | 20.0 | | 25.0 | | 55.0 | | 52.0 |
| P19 | S17 | 64.0 | | | | 25.0 | | 30.0 | | 45.0 | | 36.0 |
| P26 | S18 | 70.0 | | | | 20.0 | | 20.0 | | 60.0 | | 30.0 |

Resin Particle P15

A single-layer resin particle P15 was synthesized by emulsion polymerization by the following procedure. One hundred (100.0) parts of water was put into a four-necked flask equipped with a stirrer, a reflux condenser, and a nitrogen inlet tube, and the reaction system was heated to 80° C. while stirring and introducing a nitrogen gas. A monomer emulsion was prepared by mixing 100.0 parts of water, 1.0 part of sodium lauryl sulfate (emulsifier), 30.8 parts of 2EHA, 52.4 parts of MMA, and 16.8 parts of AA. The monomer emulsion and 10.0 parts of 5.0% potassium persulfate aqueous solution were added dropwise to the flask over 3 hours. After 2 hours of aging, the solid content was adjusted with an appropriate quantity of ion-exchanged water. In this way, an aqueous dispersion of a single-layer resin particle P15 containing 15.0% resin (solid content) was obtained.

Resin Particle P18

A resin particle having a core-shell structure P18 was synthesized by emulsion polymerization by the following procedure. One hundred (100.0) parts of water was put into a four-necked flask equipped with a stirrer, a reflux condenser, and a nitrogen inlet tube, and the reaction system was heated to 80° C. while stirring and introducing a nitrogen gas. Monomer emulsion A was prepared by mixing 40.0 parts of water, 0.4 parts of sodium lauryl sulfate (emulsifier), 8.0 parts of 2EHA, and 32.0 parts of MMA. Monomer emulsion A and 4.0 parts of 5.0% potassium persulfate aqueous solution (polymerization initiator) were added dropwise to the flask over 1 hour. The mixture was aged for 2 hours until a resin particle as the core polymer had been synthesized. Separately, monomer emulsion B was prepared by mixing 60.0 parts of water, 0.6 parts of sodium lauryl sulfate (emulsifier), 16.8 parts of 2EHA, 26.4 parts of MMA, and 16.8 parts of AA. Monomer emulsion B and 15.0 parts of 5.0% potassium persulfate aqueous solution were added dropwise to the aforementioned flask over 1 hour. After 2 hours of aging, the solid content was with an appropriate quantity of ion-exchanged water. In this way, an aqueous dispersion of a resin particle having a core-shell structure P18 containing 15.0% resin (solid content) was obtained. The acid value of the shell polymer of resin particle P18 was 218 mg KOH/g.

Water-Soluble Resin P20

Water-soluble resin P20 was synthesized by emulsion polymerization by the following procedure. One hundred (100.0) parts of water was put into a four-necked flask equipped with a stirrer, a reflux condenser, and a nitrogen inlet tube, and the reaction system was heated to 80° C. while stirring and introducing a nitrogen gas. A monomer emulsion was prepared by mixing 100.0 parts of water, 1.0 part of sodium lauryl sulfate (emulsifier), 24.8 parts of 2EHA, 58.4 parts of MMA, and 16.8 parts of AA. The monomer emulsion and 10.0 parts of 5.0% potassium persulfate aqueous solution were added dropwise to the flask over 3 hours. After 2 hours of aging, the solid content was adjusted with an appropriate quantity of ion-exchanged water. In this way, an aqueous solution of water-soluble resin P20 containing 15.0% resin (solid content) was obtained.

Resin Particle P21

A single-layer resin particle P21 was synthesized by emulsion polymerization by the following procedure. Eight hundred (800.0) parts of water, 1.0 part of sodium lauryl sulfate (emulsifier), and 6.0 parts of potassium persulfate were put into a four-necked flask equipped with a stirrer, a reflux condenser, and a nitrogen inlet tube, and the reaction system was heated to 75° C. while stirring and introducing a nitrogen gas. A monomer emulsion was prepared by mixing 450.0 parts of water, 2.0 parts of sodium lauryl sulfate (emulsifier), 20.0 parts of AAm, 600.0 parts of MMA, 215.0 parts of nBA, 30.0 parts of MAA, and 5.0 parts of TEGdAc. The monomer emulsion was added dropwise to the flask over 5 hours. After 3 hours of aging, the solid content was adjusted with an appropriate quantity of ion-exchanged water. In this way, an aqueous dispersion of a single-layer resin particle P21 containing 30.0% resin (solid content) was obtained.

Resin Particle P22

A single-layer resin particle P22 was synthesized by emulsion polymerization by the following procedure. Nine hundred (900.0) parts of water, 3.0 parts of sodium lauryl sulfate (emulsifier), and 4.0 parts of potassium persulfate were put into a four-necked flask equipped with a stirrer, a reflux condenser, and a nitrogen inlet tube, and the reaction system was heated to 70° C. while stirring and introducing a nitrogen gas.

A monomer emulsion was prepared by mixing 450.0 parts of water, 3.0 parts of sodium lauryl sulfate (emulsifier), 20.0 parts of AAm, 300.0 parts of St, 640.0 parts of nBA, 30.0 parts of MAA, and 5.0 parts of TEGdAc. The monomer emulsion was added dropwise to the flask over 4 hours. After 3 hours of aging, the solid content was adjusted with an appropriate quantity of ion-exchanged water. In this way, an aqueous dispersion of a single-layer resin particle P22 containing 30.0% resin (solid content) was obtained.

Resin Particle P23

A single-layer resin particle P23 was synthesized by emulsion polymerization by the following procedure. Nine hundred (900.0) parts of water, 3.0 parts of sodium lauryl sulfate (emulsifier), and 4.0 parts of potassium persulfate were put into a four-necked flask equipped with a stirrer, a reflux condenser, and a nitrogen inlet tube, and the reaction system was heated to 70° C. while stirring and introducing a nitrogen gas. A monomer emulsion was prepared by mixing 450.0 parts of water, 3.0 parts of sodium lauryl sulfate (emulsifier), 20.0 parts of AAm, 130.0 parts of St, 780.0 parts of 2EHA, 30.0 parts of MAA, and 2.0 parts of EGdMAc. The monomer emulsion was added dropwise to the flask over 4 hours. After 3 hours of aging, the solid content was adjusted with an appropriate quantity of ion-exchanged water. In this way, an aqueous dispersion of a single-layer resin particle P23 containing 15.0% resin (solid content) was obtained.

Resin Particle P24

A single-layer resin particle P24 was synthesized by emulsion polymerization by the following procedure. Nine hundred (900.0) parts of water, 3.0 parts of sodium lauryl sulfate (emulsifier), and 4.0 parts of potassium persulfate were put into a four-necked flask equipped with a stirrer, a reflux condenser, and a nitrogen inlet tube, and the reaction system was heated to 70° C. while stirring and introducing a nitrogen gas. A monomer emulsion was prepared by mixing 450.0 parts of water, 3.0 parts of sodium lauryl sulfate (emulsifier), 20.0 parts of AAm, 300.0 parts of St, 640.0 parts of nBA, and 30.0 parts of MAA. The monomer emulsion was added dropwise to the flask over 4 hours. After 3 hours of aging, the solid content was adjusted with an appropriate quantity of ion-exchanged water. In this way, an aqueous dispersion of a single-layer resin particle P24 containing 30.0% resin (solid content) was obtained.

Resin Particle P25

A single-layer resin particle P25 was synthesized by emulsion polymerization by the following procedure. One hundred and thirty (130.0) parts of water and 2.0 parts of potassium persulfate (polymerization initiator) were put into a four-necked flask equipped with a stirrer, a reflux condenser, and a nitrogen inlet tube, and the reaction system was heated to 80° C. while stirring and introducing a nitrogen gas. A monomer emulsion was prepared by mixing 280.0 parts of water, 60.0 parts of EMA, 36.0 parts of MMA, 4.0 parts of MAA, 3.0 parts of octyl thioglycolate (chain transfer agent), and 1.0 part of polyvinyl alcohol (emulsifier). The monomer emulsion was added dropwise to the flask over 4 hours. After 1 hour of aging, the solid content was adjusted with an appropriate quantity of ion-exchanged water. In this way, an aqueous dispersion of a single-layer resin particle P25 containing 15.0% resin (solid content) was obtained.

Major Characteristics of Resins

Table 3 summarizes the following characteristics of the obtained resins: the composition of monomer units (%), physical form, polymerization method, resin content (solid content, %) in the aqueous dispersion or aqueous solution, acid value, core-shell ratio, and particle diameter.

TABLE 3

Major Characteristics of Resins

| Resin | tBA | HA | NA | 2EHA | LA | MMA | EMA | nBMA | tBMA | AA | MAA | AAm | nBA | St | Others |
|---|---|---|---|---|---|---|---|---|---|---|---|---|---|---|---|
| P1 | | | | 30.8 | | 52.4 | | | | | 16.8 | | | | |
| P2 | | 7.2 | | | 22.1 | 22.4 | 7.2 | 23.2 | | | 17.9 | | | | |
| P3 | | | 39.8 | | | 20.0 | 21.0 | | | | 19.2 | | | | |
| P4 | 4.5 | 35.0 | | | 7.5 | | | | 30.6 | | 22.4 | | | | |
| P5 | | | | 30.8 | | 50.0 | | | | | 19.2 | | | | |
| P6 | | | | 29.0 | | 50.0 | | | | | 21.0 | | | | |
| P7 | | | | 22.1 | | 27.1 | | 31.9 | | | 18.9 | | | | |
| P8 | | | | 29.6 | | 60.8 | | | | | 9.6 | | | | |
| P9 | | | | 30.8 | | 52.4 | | | | | 16.8 | | | | |
| P10 | | | | 30.8 | | 52.4 | | | | | 16.8 | | | | |
| P11 | | | | 34.4 | | 43.2 | | | | | 22.4 | | | | |
| P12 | | | | 33.5 | | 45.5 | | | | | 21.0 | | | | |
| P13 | | | | 27.2 | | 61.6 | | | | | 11.2 | | | | |
| P14 | | | | 26.5 | | 63.4 | | | | | 10.1 | | | | |
| P15 | | | | 30.8 | | 52.4 | | | | | 16.8 | | | | |
| P16 | | | | 21.4 | | 32.6 | | 18.0 | | | 28.0 | | | | |
| P17 | | | | 20.0 | | 25.5 | | 28.6 | | | 25.9 | | | | |
| P18 | | | | 24.8 | | 58.4 | | | | | 16.8 | | | | |
| P19 | | | | 24.4 | | 35.1 | | 16.2 | | | 24.3 | | | | |
| P20 | | | | 24.8 | | 58.4 | | | | | 16.8 | | | | |
| P21 | | | | | | 69.0 | | | | 3.4 | 2.3 | 24.7 | | | TEGdAc: 0.6 |
| P22 | | | | | | | | | | 3.0 | 2.0 | 64.3 | 30.2 | | TEGdAc: 0.5 |
| P23 | | | | 81.1 | | | | | | 3.1 | 2.1 | | | 13.5 | EGdMAc: 0.2 |
| P24 | | | | | | | | | | 3.0 | 2.0 | 64.7 | 30.3 | | |
| P25 | | | | | | 36.0 | 60.0 | | | | 4.0 | | | | |
| P26 | | | | 21.4 | | 29.1 | | 18.0 | | | 31.5 | | | | |

| Resin | Physical form | Polymerization method | Resin Content (%) | Acid value (mg KOH/g) | Core-shell ratio | Particle diameter (nm) |
|---|---|---|---|---|---|---|
| P1 | Particle | Soap-free | 15.0 | 130 | 0.67 | 95 |
| P2 | Particle | Soap-free | 15.0 | 140 | 0.56 | 95 |

TABLE 3-continued

Major Characteristics of Resins

| | | | | | | |
|---|---|---|---|---|---|---|
| P3 | Particle | Soap-free | 15.0 | 125 | 0.67 | 100 |
| P4 | Particle | Soap-free | 15.0 | 145 | 0.43 | 105 |
| P5 | Particle | Soap-free | 15.0 | 150 | 0.67 | 95 |
| P6 | Particle | Soap-free | 15.0 | 165 | 0.67 | 95 |
| P7 | Particle | Soap-free | 15.0 | 145 | 1.4 | 115 |
| P8 | Particle | Soap-free | 15.0 | 75 | 0.35 | 95 |
| P9 | Particle | Soap-free | 15.0 | 130 | 0.67 | 32 |
| P10 | Particle | Soap-free | 15.0 | 130 | 0.67 | 28 |
| P11 | Particle | Soap-free | 15.0 | 175 | 0.25 | 100 |
| P12 | Particle | Soap-free | 15.0 | 165 | 0.33 | 100 |
| P13 | Particle | Soap-free | 15.0 | 85 | 1.5 | 100 |
| P14 | Particle | Soap-free | 15.0 | 80 | 1.8 | 100 |
| P15 | Particle | Emulsion | 15.0 | 130 | — | 100 |
| P16 | Particle | Soap-free | 15.0 | 220 | 0.43 | 105 |
| P17 | Particle | Soap-free | 15.0 | 200 | 1.1 | 100 |
| P18 | Particle | Emulsion | 15.0 | 130 | 0.67 | 100 |
| P19 | Particle | Soap-free | 15.0 | 190 | 0.56 | 100 |
| P20 | Water-soluble | Emulsion | 15.0 | 130 | — | 0 |
| P21 | Particle | Emulsion | 30.0 | 22 | — | 100 |
| P22 | Particle | Emulsion | 30.0 | 20 | — | 100 |
| P23 | Particle | Emulsion | 15.0 | 20 | — | 140 |
| P24 | Particle | Emulsion | 30.0 | 20 | — | 80 |
| P25 | Particle | Emulsion | 15.0 | 30 | — | 135 |
| P26 | Particle | Soap-free | 15.0 | 245 | 0.43 | 120 |

Preparation of Pigment Dispersions

Pigment Dispersion K1

A mixture of 10.0 parts of pigment, 25.0 parts of aqueous resin solution A, and 65.0 parts of water was prepared. The pigment was carbon black (Black Pearls 880, Cabot Specialty Chemicals Inc.). Aqueous resin solution A was an aqueous solution containing 20.0% resin dispersant (solid content) and contained a styrene-acrylic acid copolymer (a water-soluble resin) having an acid value of 130 mg KOH/g and a weight-average molecular weight of 8,000 and neutralized with an amount of sodium hydroxide equivalent to the acid value of the copolymer. The mixture was put into a bead mill (LMZ2, Ashizawa Finetech) 80.0% loaded with 0.3-mm diameter zirconia beads, and the pigment was dispersed at a revolution speed of 1,800 rpm for 5 hours. The aggregate was removed by centrifugation at 5,000 rpm for 30 minutes, and the residue was diluted with water. The obtained pigment dispersion K1 contained 22.50% resin-dispersed pigment (15.00% pigment and 7.50% water-soluble resin [resin dispersant]). The average particle diameter of the resin-dispersed pigment in pigment dispersion K1 was 90 nm.

Pigment Dispersion K2

Pigment dispersion K2 was prepared in the same way as pigment dispersion K1 except that aqueous resin solution A was changed to aqueous resin solution B. Aqueous resin solution B was an aqueous solution containing 20.0% resin dispersant (solid content) and contained a styrene-acrylic acid copolymer (a water-soluble resin) having an acid value of 170 mg KOH/g and a weight-average molecular weight of 8,000 and neutralized with an amount of sodium hydroxide equivalent to the acid value of the copolymer. The obtained pigment dispersion K2 contained 22.50% resin-dispersed pigment (15.00% pigment and 7.50% water-soluble resin [resin dispersant]). The average particle diameter of the resin-dispersed pigment in pigment dispersion K2 was 100 nm.

Pigment Dispersion C1

Pigment dispersion C1 was prepared in the same way as pigment dispersion K1 except that the pigment was changed to C.I. Pigment Blue 15:3 (Toner Cyan BG, Clariant). The obtained pigment dispersion C1 contained 22.50% resin-dispersed pigment (15.00% pigment and 7.50% water-soluble resin [resin dispersant]). The average particle diameter of the resin-dispersed pigment in pigment dispersion C1 was 90 nm.

Pigment Dispersion C2

Pigment dispersion C2 was prepared in the same way as pigment dispersion C1 except that aqueous resin solution A was changed to aqueous resin solution B, used to prepare pigment dispersion K2. The obtained pigment dispersion C2 contained 22.50% resin-dispersed pigment (15.00% pigment and 7.50% water-soluble resin [resin dispersant]). The average particle diameter of the resin-dispersed pigment in pigment dispersion C2 was 110 nm.

Pigment Dispersion M1

Pigment dispersion M1 was prepared in the same way as pigment dispersion K1 except that the pigment was changed to C.I. Pigment Red 122 (Toner Magenta E02, Clariant). The obtained pigment dispersion M1 contained 22.50% resin-dispersed pigment (15.00% pigment and 7.50% water-soluble resin [resin dispersant]). The average particle diameter of the resin-dispersed pigment in pigment dispersion M1 was 95 nm.

Pigment Dispersion M2

Pigment dispersion M2 was prepared in the same way as pigment dispersion M1 except that aqueous resin solution A was changed to aqueous resin solution B, used to prepare pigment dispersion K2. The obtained pigment dispersion M2 contained 22.50% resin-dispersed pigment (15.00% pigment and 7.50% water-soluble resin [resin dispersant]). The average particle diameter of the resin-dispersed pigment in pigment dispersion M2 was 100 nm.

Pigment Dispersion Y1

Pigment dispersion Y1 was prepared in the same way as pigment dispersion K1 except that the pigment was changed to C.I. Pigment Yellow 74 (Hansa Yellow 5GXB, Clariant). The obtained pigment dispersion Y1 contained 22.50% resin-dispersed pigment (15.00% pigment and 7.50% water-soluble resin [resin dispersant]). The average particle diameter of the resin-dispersed pigment in pigment dispersion Y1 was 95 nm.

Pigment Dispersion Y2

Pigment dispersion Y2 was prepared in the same way as pigment dispersion Y1 except that aqueous resin solution A was changed to aqueous resin solution B, used to prepare pigment dispersion K2. The obtained pigment dispersion Y2 contained 22.50% resin-dispersed pigment (15.00% pigment and 7.50% water-soluble resin [resin dispersant]). The average particle diameter of the resin-dispersed pigment in pigment dispersion Y2 was 110 nm.

Pigment Dispersion K3

To a solution of 5 g of concentrated hydrochloric acid in 5.5 g of water, 1.5 g of 4-aminophthalic acid was added with the solution cooled to 5° C. The vessel containing this solution was put into an ice bath and stirred so that the temperature of the solution was maintained at 10° C. or less, and a solution of 1.8 g of sodium nitrite in 9 g of water at 5° C. was added. After 15 minutes of stirring, 6 g of a carbon black having a specific surface area of 220 m$^2$/g and a DBP oil absorption of 105 mL/100 g was added under stirring, followed by another 15 minutes of stirring. The obtained slurry was filtered through filter paper (Standard Filter Paper No. 2, Advantec), the collected particle was thoroughly washed with water, and the washed particle was dried in an oven at 110° C. The dried particle was treated with hydrochloric acid, and the anionic group was neutralized with aqueous ammonia. The obtained self-dispersible pigment, a carbon black particle having a —$C_6H_3$—$(COONH_4)_2$ group bonded to the surface thereof, was diluted with water to make the content of the self-dispersible pigment 15.00% in the resulting pigment dispersion K3. The average particle diameter of the self-dispersible pigment in pigment dispersion K3 was 80 nm.

Pigment Dispersion C3

Pigment dispersion C3 was prepared in the same way as pigment dispersion K3 except that the pigment was changed to C.I. Pigment Blue 15:3 (Toner Cyan BG, Clariant). The obtained pigment dispersion C1 contained 15.00% self-dispersible pigment, and the self-dispersible pigment was a C.I. Pigment Blue 15:3 particle having a —$C_6H_3$—$(COONH_4)_2$ group bonded to the surface thereof. The average particle diameter of the resin-dispersed pigment in pigment dispersion C3 was 80 nm.

Preparation of Inks

The individual inks were prepared by mixing and thoroughly stirring the components (unit: %) specified in the upper rows of Tables 4 to 6 and then filtering the obtained mixture under pressure using a membrane filter having a pore size of 1.2 μm (HDC II Filter, Pall). Among the upper rows of Tables 4 to 6, the "Resin" row shows the number for the resin particle or water-soluble resin used, and the "Resin-containing liquid used" row shows the amount of use of the aqueous dispersion of the resin particle or the aqueous solution of the water-soluble resin. Acetylenol E100 (trade name) is a surfactant manufactured by Kawaken Fine Chemicals, and the polyethylene glycol used had a number average molecular weight of 1,000. The lower rows of Tables 4 to 6 indicate the surface tension of the ink, the content (%) of the self-dispersible carbon black, and the following information on the particle (resin particle or resin-dispersed pigment): kind, content (%), acid value (mg KOH/g), particle diameter (nm), and mass ratio (the content of the particle/the content of the self-dispersible pigment). The surface tension of each ink was measured using a surface tensiometer (CBVP-A3, Kyowa Interface Science Co., Ltd.).

TABLE 4

Composition and Characteristics of Inks

| | Ink | | | | | | | | |
|---|---|---|---|---|---|---|---|---|---|
| | 1 | 2 | 3 | 4 | 5 | 6 | 7 | 8 | 9 |
| Resin | P1 | P1 | P1 | P1 | P1 | P1 | P1 | P1 | P1 |
| Resin-containing liquid used | 2.00 | 1.50 | 1.25 | 1.76 | 2.33 | 0.33 | 2.67 | 3.33 | 0.67 |
| Pigment dispersion K1 | | | | | | | | | |
| Pigment dispersion K2 | | | | | | | | | |
| Pigment dispersion C1 | | | | | | | | | |
| Pigment dispersion C2 | | | | | | | | | |
| Pigment dispersion M1 | | | | | | | | | |
| Pigment dispersion M2 | | | | | | | | | |
| Pigment dispersion Y1 | | | | | | | | | |
| Pigment dispersion Y2 | | | | | | | | | |
| Pigment dispersion K3 | 26.67 | 22.06 | 22.50 | 22.00 | 9.33 | 5.95 | 33.33 | 13.30 | 22.22 |
| Pigment dispersion C3 | | | | | | | | | |
| Glycerol | 7.00 | 7.00 | 7.00 | 7.00 | 7.00 | 7.00 | 7.00 | 7.00 | 7.00 |
| Polyethylene glycol | 5.00 | 5.00 | 5.00 | 5.00 | 5.00 | 5.00 | 5.00 | 5.00 | 5.00 |
| Trimethylolpropane | 5.00 | 5.00 | 5.00 | 5.00 | 5.00 | 5.00 | 5.00 | 5.00 | 5.00 |
| Triethylene glycol monobutyl ether | 3.00 | 3.00 | 3.00 | 3.00 | 3.00 | 3.00 | 3.00 | 3.00 | 3.00 |
| Acetylenol E100 | 0.25 | 0.25 | 0.25 | 0.25 | 0.25 | 0.25 | 0.25 | 0.25 | 0.25 |
| Ion-exchanged water | 51.08 | 56.19 | 56.00 | 55.99 | 68.09 | 73.47 | 43.75 | 63.12 | 56.86 |
| Surface tension (mN/m) | 35 | 35 | 35 | 35 | 35 | 35 | 35 | 35 | 35 |
| Self-dispersible CB content (%) | 4.00 | 3.31 | 3.38 | 3.30 | 1.40 | 0.89 | 5.00 | 2.00 | 3.33 |
| Particle | P1 | P1 | P1 | P1 | P1 | P1 | P1 | P1 | P1 |
| Content of the particle (%) | 0.30 | 0.23 | 0.19 | 0.26 | 0.35 | 0.05 | 0.40 | 0.50 | 0.10 |
| Acid value of the particle (mg KOH/g) | 130 | 130 | 130 | 130 | 130 | 130 | 130 | 130 | 130 |
| Diameter of the particle (nm) | 95 | 95 | 95 | 95 | 95 | 95 | 95 | 95 | 95 |
| Mass ratio (times) | 0.075 | 0.069 | 0.056 | 0.079 | 0.250 | 0.056 | 0.080 | 0.250 | 0.030 |

| | Ink | | | | | | | |
|---|---|---|---|---|---|---|---|---|
| | 10 | 11 | 12 | 13 | 14 | 15 | 16 | 17 |
| Resin | P1 | P1 | P1 | P2 | P3 | P4 | P5 | P6 |
| Resin-containing liquid used | 3.33 | 0.27 | 4.00 | 1.50 | 1.50 | 1.50 | 1.50 | 1.50 |
| Pigment dispersion K1 | | | | | | | | |
| Pigment dispersion K2 | | | | | | | | |
| Pigment dispersion C1 | | | | | | | | |
| Pigment dispersion C2 | | | | | | | | |

TABLE 4-continued

Composition and Characteristics of Inks

| | | | | | | | | |
|---|---|---|---|---|---|---|---|---|
| Pigment dispersion M1 | | | | | | | | |
| Pigment dispersion M2 | | | | | | | | |
| Pigment dispersion Y1 | | | | | | | | |
| Pigment dispersion Y2 | | | | | | | | |
| Pigment dispersion K3 | 6.67 | 4.76 | 16.00 | 22.06 | 22.06 | 22.06 | 22.06 | 22.06 |
| Pigment dispersion C3 | | | | | | | | |
| Glycerol | 7.00 | 7.00 | 7.00 | 7.00 | 7.00 | 7.00 | 7.00 | 7.00 |
| Polyethylene glycol | 5.00 | 5.00 | 5.00 | 5.00 | 5.00 | 5.00 | 5.00 | 5.00 |
| Trimethylolpropane | 5.00 | 5.00 | 5.00 | 5.00 | 5.00 | 5.00 | 5.00 | 5.00 |
| Triethylene glycol monobutyl ether | 3.00 | 3.00 | 3.00 | 3.00 | 3.00 | 3.00 | 3.00 | 3.00 |
| Acetylenol E100 | 0.25 | 0.25 | 0.25 | 0.25 | 0.25 | 0.25 | 0.25 | 0.25 |
| Ion-exchanged water | 69.75 | 74.72 | 59.75 | 56.19 | 56.19 | 56.19 | 56.19 | 56.19 |
| Surface tension (mN/m) | 35 | 35 | 35 | 35 | 35 | 35 | 35 | 35 |
| Self-dispersible CB content (%) | 1.00 | 0.71 | 2.40 | 3.31 | 3.31 | 3.31 | 3.31 | 3.31 |
| Particle | P1 | P1 | P1 | P2 | P3 | P4 | P5 | P6 |
| Content of the particle (%) | 0.50 | 0.04 | 0.60 | 0.23 | 0.23 | 0.23 | 0.23 | 0.23 |
| Acid value of the particle (mg KOH/g) | 130 | 130 | 130 | 140 | 125 | 145 | 150 | 165 |
| Diameter of the particle (nm) | 95 | 95 | 95 | 95 | 100 | 105 | 95 | 95 |
| Mass ratio (times) | 0.500 | 0.056 | 0.250 | 0.069 | 0.069 | 0.069 | 0.069 | 0.069 |

TABLE 5

Composition and Characteristics of Inks

| | Ink | | | | | | | | |
|---|---|---|---|---|---|---|---|---|---|
| | 18 | 19 | 20 | 21 | 22 | 23 | 24 | 25 | 26 |
| Resin | P7 | P1 | P8 | P9 | P10 | P11 | P12 | P13 | P14 |
| Resin-containing liquid used | 1.50 | 1.50 | 1.50 | 1.50 | 1.50 | 1.50 | 1.50 | 1.50 | 1.50 |
| Pigment dispersion K1 | | | | | | | | | |
| Pigment dispersion K2 | | | | | | | | | |
| Pigment dispersion C1 | | | | | | | | | |
| Pigment dispersion C2 | | | | | | | | | |
| Pigment dispersion M1 | | | | | | | | | |
| Pigment dispersion M2 | | | | | | | | | |
| Pigment dispersion Y1 | | | | | | | | | |
| Pigment dispersion Y2 | | | | | | | | | |
| Pigment dispersion K3 | 22.06 | 22.06 | 22.06 | 22.06 | 22.06 | 22.06 | 22.06 | 22.06 | 22.06 |
| Pigment dispersion C3 | | | | | | | | | |
| Glycerol | 7.00 | 7.00 | 7.00 | 7.00 | 7.00 | 7.00 | 7.00 | 7.00 | 7.00 |
| Polyethylene glycol | 5.00 | 5.00 | 5.00 | 5.00 | 5.00 | 5.00 | 5.00 | 5.00 | 5.00 |
| Trimethylolpropane | 5.00 | 5.00 | 5.00 | 5.00 | 5.00 | 5.00 | 5.00 | 5.00 | 5.00 |
| Triethylene glycol monobutyl ether | 3.00 | 3.00 | 3.00 | 3.00 | 3.00 | 3.00 | 3.00 | 3.00 | 3.00 |
| Acetylenol E100 | 0.25 | 0.75 | 0.25 | 0.25 | 0.25 | 0.25 | 0.25 | 0.25 | 0.25 |
| Ion-exchanged water | 56.19 | 55.69 | 56.19 | 56.19 | 56.19 | 56.19 | 56.19 | 56.19 | 56.19 |
| Surface tension (mN/m) | 36 | 31 | 35 | 35 | 35 | 35 | 35 | 35 | 35 |
| Self-dispersible CB content (%) | 3.31 | 3.31 | 3.31 | 3.31 | 3.31 | 3.31 | 3.31 | 3.31 | 3.31 |
| Particle | P7 | P1 | P8 | P9 | P10 | P11 | P12 | P13 | P14 |
| Content of the particle (%) | 0.23 | 0.23 | 0.23 | 0.23 | 0.23 | 0.23 | 0.23 | 0.23 | 0.23 |
| Acid value of the particle (mg KOH/g) | 145 | 130 | 75 | 130 | 130 | 175 | 165 | 85 | 80 |
| Diameter of the particle (nm) | 115 | 95 | 95 | 32 | 28 | 100 | 100 | 100 | 100 |
| Mass ratio (times) | 0.069 | 0.069 | 0.069 | 0.069 | 0.069 | 0.069 | 0.069 | 0.069 | 0.069 |

| | Ink | | | | | | | |
|---|---|---|---|---|---|---|---|---|
| | 27 | 28 | 29 | 30 | 31 | 32 | 33 | 34 |
| Resin | P15 | P16 | P17 | P18 | P19 | P20 | P19 | P26 |
| Resin-containing liquid used | 1.50 | 1.50 | 1.50 | 1.50 | 1.50 | 1.50 | 12.00 | 12.00 |
| Pigment dispersion K1 | | | | | | | | |
| Pigment dispersion K2 | | | | | | | | |
| Pigment dispersion C1 | | | | | | | | |
| Pigment dispersion C2 | | | | | | | | |
| Pigment dispersion M1 | | | | | | | | |
| Pigment dispersion M2 | | | | | | | | |
| Pigment dispersion Y1 | | | | | | | | |
| Pigment dispersion Y2 | | | | | | | | |
| Pigment dispersion K3 | 22.06 | 22.06 | 22.06 | 22.06 | 22.06 | 22.06 | | |
| Pigment dispersion C3 | | | | | | | | |
| Glycerol | 7.00 | 7.00 | 7.00 | 7.00 | 7.00 | 7.00 | 7.00 | 7.00 |
| Polyethylene glycol | 5.00 | 5.00 | 5.00 | 5.00 | 5.00 | 5.00 | 5.00 | 5.00 |
| Trimethylolpropane | 5.00 | 5.00 | 5.00 | 5.00 | 5.00 | 5.00 | 5.00 | 5.00 |
| Triethylene glycol monobutyl ether | 3.00 | 3.00 | 3.00 | 3.00 | 3.00 | 3.00 | 3.00 | 3.00 |
| Acetylenol E100 | 0.25 | 0.25 | 0.25 | 0.25 | 0.25 | 0.25 | 0.50 | 0.50 |

TABLE 5-continued

Composition and Characteristics of Inks

| | | | | | | | | |
|---|---|---|---|---|---|---|---|---|
| Ion-exchanged water | 56.19 | 56.19 | 56.19 | 56.19 | 56.19 | 56.19 | 67.50 | 67.50 |
| Surface tension (mN/m) | 35 | 35 | 35 | 35 | 35 | 35 | 33 | 33 |
| Self-dispersible CB content (%) | 3.31 | 3.31 | 3.31 | 3.31 | 3.31 | 3.31 | 0.00 | 0.00 |
| Particle | P15 | P16 | P17 | P18 | P19 | None | P19 | P26 |
| Content of the particle (%) | 0.23 | 0.23 | 0.23 | 0.23 | 0.23 | 0.00 | 1.80 | 1.80 |
| Acid value of the particle (mg KOH/g) | 130 | 220 | 200 | 130 | 190 | — | 190 | 245 |
| Diameter of the particle (nm) | 100 | 105 | 100 | 100 | 100 | — | 100 | 120 |
| Mass ratio (times) | 0.069 | 0.069 | 0.069 | 0.069 | 0.069 | 0.000 | — | — |

TABLE 6

Composition and Characteristics of Inks

| | Ink | | | | | | | | | |
|---|---|---|---|---|---|---|---|---|---|---|
| | 35 | 36 | 37 | 38 | 39 | 40 | 41 | 42 | 43 | 44 |
| Resin | — | — | — | — | — | — | — | — | — | P22/P23 |
| Resin-containing liquid used | | | | | | | | | | 10.00/30.00 |
| Pigment dispersion K1 | 1.83 | | | | | | | | | |
| Pigment dispersion K2 | | 12.00 | | | | | | | | |
| Pigment dispersion C1 | | | 1.83 | | | | | | | |
| Pigment dispersion C2 | | | | 12.00 | | | | | | |
| Pigment dispersion M1 | | | | | 1.83 | | | | | |
| Pigment dispersion M2 | | | | | | 12.00 | | | | |
| Pigment dispersion Y1 | | | | | | | 1.83 | | | |
| Pigment dispersion Y2 | | | | | | | | 12.00 | | |
| Pigment dispersion K3 | 11.98 | | 11.98 | | 11.98 | | 11.98 | | 11.98 | 30.00 |
| Pigment dispersion C3 | | | | | | | | | 1.83 | |
| Glycerol | 7.00 | 7.00 | 7.00 | 7.00 | 7.00 | 7.00 | 7.00 | 7.00 | 7.00 | 7.00 |
| Polyethylene glycol | 5.00 | 5.00 | 5.00 | 5.00 | 5.00 | 5.00 | 5.00 | 5.00 | 5.00 | 5.00 |
| Trimethylolpropane | 5.00 | 5.00 | 5.00 | 5.00 | 5.00 | 5.00 | 5.00 | 5.00 | 5.00 | 5.00 |
| Triethylene glycol monobutyl ether | 3.00 | 3.00 | 3.00 | 3.00 | 3.00 | 3.00 | 3.00 | 3.00 | 3.00 | 3.00 |
| Acetylenol E100 | 0.10 | 0.50 | 0.25 | 0.25 | 0.25 | 0.50 | 0.25 | 0.75 | 0.10 | 1.00 |
| Ion-exchanged water | 66.09 | 67.50 | 65.94 | 67.75 | 65.94 | 67.50 | 65.94 | 67.25 | 66.09 | 9.00 |
| Surface tension (mN/m) | 35 | 33 | 35 | 33 | 35 | 33 | 36 | 34 | 38 | 27 |
| Self-dispersible CB content (%) | 1.80 | 0.00 | 1.80 | 0.00 | 1.80 | 0.00 | 1.80 | 0.00 | 1.80 | 4.50 |
| Particle | K1 | K2 | C1 | C2 | M1 | M2 | Y1 | Y2 | None | P22/P23 |
| Content of the particle (%) | 0.41 | 2.70 | 0.41 | 2.70 | 0.41 | 2.70 | 0.41 | 2.70 | 0.00 | 7.50 |
| Acid value of the particle (mg KOH/g) | 130 | 170 | 130 | 170 | 130 | 170 | 130 | 170 | — | 20/20 |
| Diameter of the particle (nm) | 90 | 100 | 90 | 110 | 95 | 100 | 95 | 110 | — | 100/140 |
| Mass ratio (times) | 0.228 | — | 0.228 | — | 0.228 | — | 0.228 | — | 0.000 | 1.667 |

| | Ink | | | | | | |
|---|---|---|---|---|---|---|---|
| | 45 | 46 | 47 | 48 | 49 | 50 | 51 |
| Resin | P22/P24 | P21/P24 | P23 | P25 | — | P1 | P19 |
| Resin-containing liquid used | 8.00/5.00 | 10.00/5.00 | 30.00 | 33.50 | | 1.50 | 6.00 |
| Pigment dispersion K1 | | | | | | | |
| Pigment dispersion K2 | | | | | | | 6.00 |
| Pigment dispersion C1 | | | | | 12.00 | | |
| Pigment dispersion C2 | | | | | | | |
| Pigment dispersion M1 | | | | | | | |
| Pigment dispersion M2 | | | | | | | |
| Pigment dispersion Y1 | | | | | | | |
| Pigment dispersion Y2 | | | | | | | |
| Pigment dispersion K3 | 40.00 | 50.00 | 30.00 | 1.33 | | 22.06 | |
| Pigment dispersion C3 | | | | | | | |
| Glycerol | 7.00 | 7.00 | 7.00 | 7.00 | 7.00 | 7.00 | 7.00 |
| Polyethylene glycol | 5.00 | 5.00 | 5.00 | 5.00 | 5.00 | 5.00 | 5.00 |
| Trimethylolpropane | 5.00 | 5.00 | 5.00 | 5.00 | 5.00 | 5.00 | 5.00 |
| Triethylene glycol monobutyl ether | 3.00 | 3.00 | 3.00 | 3.00 | 3.00 | 3.00 | 3.00 |
| Acetylenol E100 | 1.00 | 1.00 | 1.00 | 0.50 | 0.25 | 0.50 | 0.75 |
| Ion-exchanged water | 26.00 | 14.00 | 19.00 | 44.67 | 67.75 | 55.94 | 67.25 |
| Surface tension (mN/m) | 28 | 29 | 29 | 33 | 33 | 33 | 34 |
| Self-dispersible CB content (%) | 6.00 | 7.50 | 4.50 | 0.20 | 0.00 | 3.31 | 0.00 |
| Particle | P22/P24 | P21/P24 | P23 | P25 | C1 | P1 | P19/K2 |
| Content of the particle (%) | 3.90 | 4.50 | 4.50 | 5.03 | 2.70 | 0.23 | 2.25 |
| Acid value of the particle (mg KOH/g) | 20/20 | 22/20 | 20 | 30 | 130 | 130 | 170 |
| Diameter of the particle (nm) | 100/80 | 100/80 | 140 | 135 | 90 | 95 | 110 |
| Mass ratio (times) | 0.650 | 0.600 | 1.000 | 25.150 | — | 0.069 | — |

Evaluation

Each of the prepared inks was loaded in an ink cartridge, and the inks were paired in accordance with the left side of Table 7 to make ink sets. The evaluations described below were conducted using an ink jet recording apparatus that utilizes thermal energy to eject inks from its recording head (PIXMA Pro9500, CANON KABUSHIKI KAISHA). The recording head had its ejection orifice surface treated with a fluoropolymer for water repellency. For this ink jet recording apparatus, a solid image recorded in a unit area of 1/600 inches by 1/600 inches using 8 drops of ink having a mass per drop of 3.5 ng (nanograms) is defined as a recording duty of 100%.

Evaluation for the Irregular Ejection Due to Continuous Use and the Ejection Orifice Surface The first ink of the ink set was loaded in the MBk ink position of the ink jet recording apparatus (the other positions were left unloaded). Using the first ink, the nozzle check pattern for PIXMA Pro9500 was recorded on glossy paper (Canon Photo Paper Plus Glossy II [PP-201], CANON KABUSHIKI KAISHA), and then a solid image with a size of 18 cm by 24 cm (a recording duty of 50%) was recorded on 100 sheets of A4 plain paper (GF-500, CANON KABUSHIKI KAISHA). The operation of recording this solid image involves cleaning of the recording head (wiping) twice per sheet and suction recovery operation once per 5 sheets. The nozzle check pattern for PIXMA Pro9500 was then recorded on glossy paper (Canon Photo Paper Plus Glossy II [PP-201], CANON KABUSHIKI KAISHA) and checked for irregular ejection. This cycle, consisting of recording the solid image on 100 sheets and recording the nozzle check pattern, was repeated until the solid image was recorded on 15,000 sheets unless irregular ejection occurred. The degree of irregular ejection due to continuous use was evaluated on the basis of the number of sheets on which the solid image could be recorded by the above operation without causing irregular ejection. Table 7 summarizes the results. Each ink set was judged to be acceptable if the grade according to the criteria defined below was AA, A, or B, or unacceptable if the grade was C. The cause of irregular ejection was also identified by checking the condition of the ejection orifice surface for any signs of worn or ink-wet surface.

Criteria for Grading Irregular Ejection Due to Continuous Use

AA: No irregular ejection occurred even after recording on 15,000 sheets.

A: Irregular ejection occurred after recording on 12,500 to 15,000 sheets.

B: Irregular ejection occurred after recording on 10,000 to 12,500 sheets.

C: Irregular ejection occurred before recording on 10,000 sheets.

Condition of the Ejection Orifice Surface

None: The ejection orifice surface was not worn or wet with the ink.

Worn: The ejection orifice surface was worn but not wet with the ink.

Wet: The ejection orifice surface was not worn but wet with the ink.

Evaluation for Irregular Ejection Due to Contact Between Inks

The first ink of the ink set was loaded in the MBk ink position and the second ink was loaded in the PBk ink position (the other positions were left unloaded). Except for this, each ink set was assessed for irregular ejection due to contact of inks in the same way as above. Table 7 summarizes the results. The ink set was judged to be acceptable if the grade according to the criteria defined below was AA, A, or B, or unacceptable if the grade was C. Note that although in this evaluation the second ink was not ejected, this evaluation was intended to evaluate the irregular ejection caused by the contact between the mist of the first ink and that of the second ink during suction recovery operation.

Criteria for Grading Irregular Ejection Due to Contact between Inks

AA: No irregular ejection occurred even after recording on 15,000 sheets.

A: Irregular ejection occurred after recording on 12,500 to 15,000 sheets.

B: Irregular ejection occurred after recording on 10,000 to 12,500 sheets.

C: Irregular ejection occurred before recording on 10,000 sheets.

TABLE 7

Constitution of Ink sets and Evaluation Results

| | | Ink set constitution | | Evaluation results | | |
| --- | --- | --- | --- | --- | --- | --- |
| | | | | Continuous use | | Ink contact |
| | | First ink | Second ink | Irregular ejection | Ejection orifice surface | Irregular ejection |
| Example | 1 | 6 | 38 | AA | None | AA |
| | 2 | 7 | 38 | AA | None | AA |
| | 3 | 8 | 38 | AA | Wet | AA |
| | 4 | 3 | 38 | AA | None | AA |
| | 5 | 4 | 38 | AA | None | AA |
| | 6 | 5 | 38 | AA | Wet | AA |
| | 7 | 1 | 49 | AA | Wet | B |
| | 8 | 35 | 38 | A | Worn | A |
| | 9 | 37 | 38 | A | Worn | A |
| | 10 | 39 | 38 | A | Worn | A |
| | 11 | 41 | 38 | A | Worn | A |
| | 12 | 16 | 38 | AA | None | AA |
| | 13 | 17 | 38 | AA | None | B |
| | 14 | 18 | 38 | AA | Wet | A |
| | 15 | 19 | 38 | AA | Wet | A |
| | 16 | 50 | 38 | AA | None | A |
| | 17 | 1 | 38 | AA | None | AA |
| | 18 | 20 | 38 | AA | None | AA |
| | 19 | 13 | 38 | AA | None | AA |
| | 20 | 14 | 38 | AA | None | AA |
| | 21 | 15 | 38 | AA | None | AA |
| | 22 | 2 | 33 | AA | None | AA |
| | 23 | 2 | 36 | AA | None | AA |
| | 24 | 2 | 38 | AA | None | AA |
| | 25 | 2 | 40 | AA | None | AA |
| | 26 | 2 | 42 | AA | None | AA |
| | 27 | 2 | 51 | AA | None | AA |
| | 28 | 21 | 38 | AA | None | AA |
| | 29 | 22 | 38 | B | Worn | B |
| | 30 | 23 | 34 | A | Wet | A |
| | 31 | 24 | 34 | AA | None | AA |
| | 32 | 25 | 38 | AA | None | AA |
| | 33 | 26 | 38 | B | Worn | B |
| | 34 | 27 | 38 | A | Wet | A |
| | 35 | 28 | 34 | B | Wet | B |
| | 36 | 29 | 38 | B | Wet | B |
| | 37 | 30 | 38 | B | Worn | B |
| Comparative Example | 1 | 43 | 38 | C | Worn | C |
| | 2 | 32 | 38 | C | Worn | C |
| | 3 | 11 | 38 | C | Worn | C |
| | 4 | 12 | 38 | C | Wet | C |
| | 5 | 9 | 38 | C | Worn | C |
| | 6 | 10 | 38 | C | Wet | C |
| | 7 | 2 | 32 | C | Worn | C |
| | 8 | 31 | 38 | AA | Wet | C |

TABLE 7-continued

Constitution of Ink sets and Evaluation Results

| | | Ink set constitution | | Evaluation results | | |
|---|---|---|---|---|---|---|
| | | | | Continuous use | | Ink contact |
| | | First ink | Second ink | Irregular ejection | orifice surface | Irregular ejection |
| | 9 | 44 | 38 | C | Wet | C |
| | 10 | 45 | 38 | C | Wet | C |
| | 11 | 46 | 38 | C | Wet | C |
| | 12 | 47 | 38 | C | Wet | C |
| | 13 | 48 | 38 | C | Wet | C |
| Reference Example | 1 | 36 | 36 | AA | None | AA |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-203098 filed Sep. 14, 2012, which is hereby incorporated by reference herein in its entirety.

What is claimed is:

1. An ink set for an ink jet comprising:
a combination of a first ink and a second ink, wherein
the first ink comprises a self-dispersible pigment and a particle A, the self-dispersible pigment being a carbon black having an anionic group bonded to a surface thereof directly or through another atomic group, and the particle A being at least one selected from the group consisting of a resin particle having an anionic group and a pigment dispersed by a water-soluble resin having an anionic group;
a content of the particle A in the first ink is 0.05% by mass or more and 0.50% by mass or less, and a mass ratio of the content of the particle A in % by mass to a content of the self-dispersible pigment in % by mass, in the first ink, is 0.056 times or more and 0.250 times or less;
the second ink comprises a particle B, the particle B being at least one selected from the group consisting of a resin particle having an anionic group and a pigment dispersed by a water-soluble resin having an anionic group; and
an acid value a of the particle A and an acid value b of the particle B satisfy a relation of $a \leq b$.

2. The ink set according to claim 1, wherein the particle A in the first ink includes the resin particle having an anionic group.

3. The ink set according to claim 1, wherein the acid value a of the particle A and the acid value b of the particle B satisfy a relation of $b-a \geq 20$.

4. The ink set according to claim 1, wherein the particle A includes a particle having a smaller average particle diameter than the particle B.

5. The ink set according to claim 1, wherein a surface tension of the first ink is higher than a surface tension of the second ink.

6. An ink jet recording method comprising applying inks to a recording medium by an ink jet system to record on the recording medium, wherein
the inks comprise the inks constituting the ink set according to claim 1.

7. The ink set according to claim 1, wherein the content (% by mass) of the self-dispersible pigment in the first ink is 0.10% by mass or more and 10.00% by mass or less.

8. The ink set according to claim 1, wherein the content (% by mass) of the particle B in the second ink is 0.10% by mass or more and 10.00% by mass or less.

9. The ink set according to claim 1, wherein the acid value a of the particle A is 40 mg KOH/g or more and 250 mg KOH/g or less.

10. The ink set according to claim 1, wherein the acid value b of the particle B is 40 mg KOH/g or more and 250 mg KOH/g or less.

11. The ink set according to claim 1, wherein the self-dispersible pigment is a carbon black having an anionic group bonded to a surface thereof through another atomic group.

* * * * *